Oct. 15, 1957    P. G. STEWART    2,809,588
POWER TRANSMISSION
Filed March 7, 1955
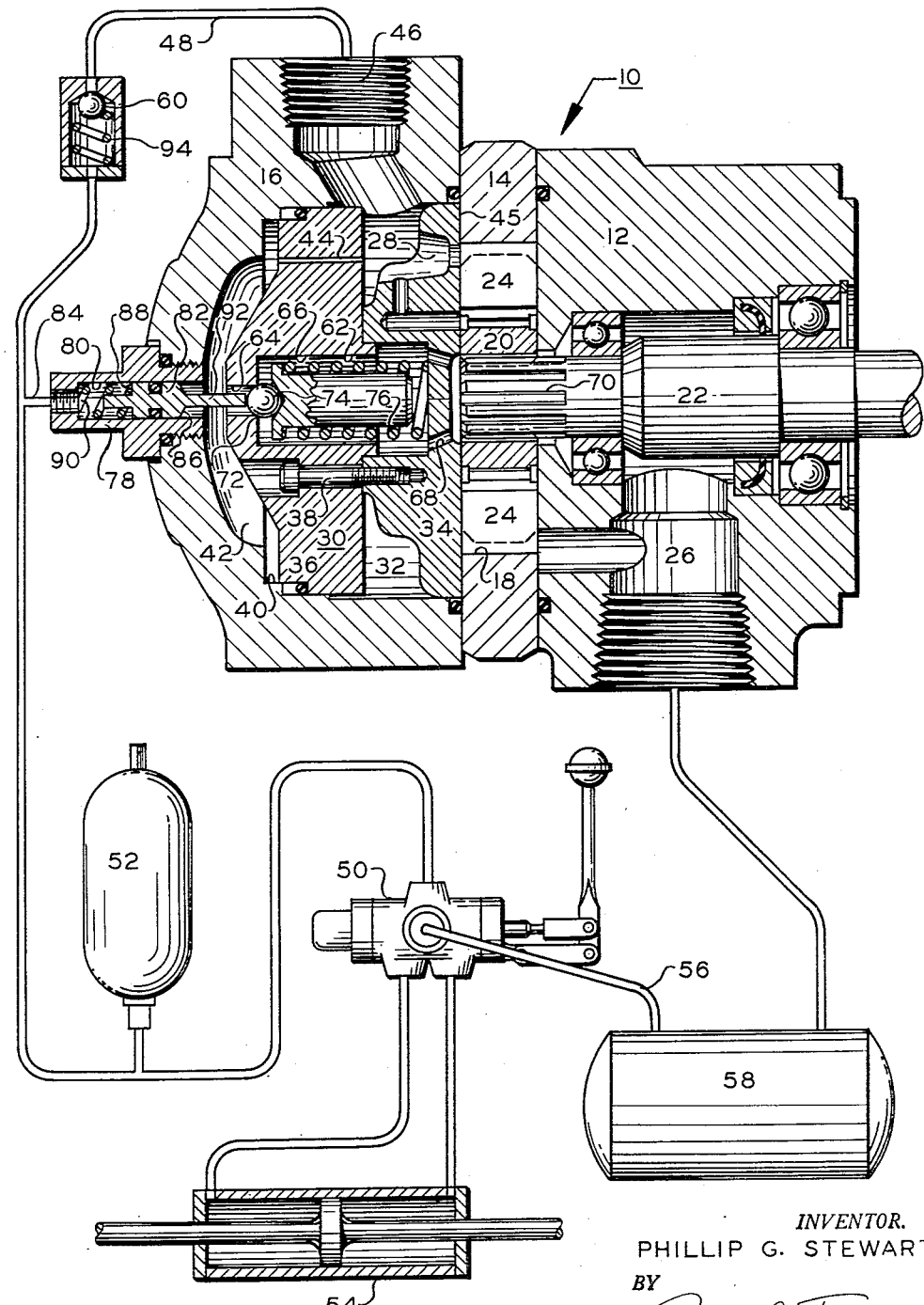
INVENTOR.
PHILLIP G. STEWART
BY
Ralph L. Tweedale
ATTORNEY United States Patent Office 2,809,588
Patented Oct. 15, 1957

2,809,588

POWER TRANSMISSION

Phillip G. Stewart, Oak Park, Mich., assignor to Vickers Incorporated, Detroit, Mich., a corporation of Michigan Application March 7, 1955, Serial No. 492,443

5 Claims. (Cl. 103—42)

This invention relates to power transmissions, and is particularly applicable to those of the type comprising two or more fluid pressure energy translating devices, one of which may function as a pump and another as a fluid motor.

More particularly the invention relates to an improved pump structure having unloading mechanism combined therewith for use in such a power transmission.

In many power transmissions a fluid motor is only intermittently operated. To conserve power it is desirable that the pump be unloaded during periods of motor non-use. Since the motor must usually be instantly available for work, such circuits ordinarily include an accumulator for storing fluid under pressure. An unloading valve is often provided which diverts the pump discharge back to the reservoir at low pressure whenever the accumulator is adequately charged. These unloading valves are usually external of the pump, occupying considerable space and requiring much added piping. Even when integrated into the pump body these valves have ordinarily maintained their separate character, requiring large size pump bodies and many intricate and costly machining operations.

It is an object of this invention to provide an integrated pumping and unloading mechanism which is compact and low in cost.

Many prior unloading valves have been subject to erratic operation and have had a tendency to hang up; that is, under certain conditions they fail to completely unload the pump even though the accumulator may be fully charged.

It is also an object of this invention to provide functionally improved unloading mechanism for such a transmission.

More particularly it is an object of this invention to provide a low cost unloading mechanism which is sensitive and dependable, and in which the hanging up tendency is minimized.

Further objects and advantages of the present invention will be apparent in the following description, reference being had to the accompanying drawing wherein a preferred form of the present invention is clearly shown.

In the drawing:

The single figure illustrates a power transmission incorporating the present invention.

Referring now to the drawing, there in shown a pump generally designated 10. Pump 10 is a modification of the radially sliding vane type described in detail in the U. S. patent to Gardiner, No. 2,544,988. The invention is, however, applicable to various types of rotary pumping mechanism.

Pump 10 includes a body 12, a ring 14 and a head 16. A pumping chamber 18 in ring 14 telescopically receives a rotor 20 which is supported on and driven by a shaft 22. Vanes 24 divide the pumping chamber into a plurality of working spaces which alternately expand, as they pass through the inlet zones, and contract, as they pass through the outlet zones, taking fluid from the inlet chamber 26 and discharging it through outlet ports 28 in a pressure plate 30 into an annular delivery channel 32 in plate 30. Plate 30 includes a valving portion 34 and a head portion 36, secured together by screws 38. Head portion 36 peripherally engages a recess 40 in head 16 to form a pressure chamber 42.

A restricted drilled passage 44 establishes communication between the pressure chamber 42 and the pump outlet source through the annular channel 32 and ports 28. Pressure in chamber 42 is thus normally maintained at pump outlet pressure and the plate 30 is urged into firm abutment with ring 14. The thickness of ring 14 is so selected that proper axial running clearance for rotor 20 and vanes 24 is provided when plate 30 abuts ring 14. Since this running clearance is normally less than one-thousandth of an inch, the inlet and outlet zones of the pumping mechanism are effectively isolated from each other by the face 45 of the valving portion 34 of plate 30.

A delivery port 46 in head 16 communicates with the channel 32 and is connected to a utilization circuit which includes a conduit 48 leading to a four-way valve 50 and to an accumulator 52. Valve 50 is connected to control an intermittently operated fluid motor 54. A return line 56 from the valve 50 leads to a reservoir 58. A spring biased check valve 60 is provided in the conduit 48. Valve 60 is so oriented as to permit flow from the pump 10 to the valve 50 and accumulator 52, and to block return flow.

Pressure plate 30 has therein a stepped bore 62 having a small portion 64 and a larger portion 66. Bore 62 forms part of a venting passage for chamber 42, which venting passage includes passages 68 and the clearance spaces around the drive shaft spline 70 and leads back to the inlet zone 26.

A valve seat 72 is formed in the venting passage 62 at the juncture of portions 64 and 66. Cooperating with the seat 72 is a ball type, pressure responsive control valve 74. Control valve 74 is biased by a spring 76 against the seat 72, and controls fluid flow in the venting passage. Spring 76 is a relatively heavy spring and the load thereof controls the pressure at which unloading of pump 10 begins. Valve 74 opens under the influence of pressure in chamber 42 and is maintained in the open position in a manner hereinafter described.

A fitting 78 is threaded into head 16 and contains a bore 80 which enters pressure chamber 42 and coaxially aligns with the stepped bore 62. Bore 80 has an imperforate plunger 82 slidable therein and in fluid sealing engagement therewith. A branch conduit 84 extends from the conduit 48, at a point downstream of the check valve 60, to communicate with the outer end of bore 80. Plunger 82 thus has a pressure in chamber 42 imposed on its inner end area 86, and pressure downstream from check valve 60 imposed on an equal and opposed area 88. A light spring 90 biases plunger 82 to the position illustrated, wherein a push rod 92 lightly contacts the control valve 74. The spring 94 of check valve 60 is a very light one. Thus, when pump 10 is operating under pressure the pressure forces on plunger 82 are substantially balanced.

The seat 72 is selected to have an area somewhat smaller than the end area of plunger 82. The ratio between the seat and plunger areas controls the pressure differential between loading and unloading of pump 10.

In operation, with the accumulator 52 in a discharged condition, the delivery from pump 10 passes over the check valve 60 into the utilization circuit. Pump operating pressure is also conducted through the restricted passage 44 into the pressure chamber 42, where it acts to maintain the face 45 of plate 30 in fluid sealing relation with rotor 20, and is imposed on control valve 74. As was heretofore noted, spring 94 in check valve 60 is a light one. Thus pressures acting on the opposed areas 86 and 88 of plunger 82 are substantially equal and plunger 82 exerts no significant force against control valve 74.

When pump outlet pressure in chamber 42 reaches a value controlled by the area of seat 72 and the load of spring 76, valve 74 will crack and thus divert fluid from the chamber 42 through the venting passage and back to the inlet zone 26. Due to the restrictive action of passage 44, the effect of this diversion is to drop the pressure in chamber 42 relative to pressure in the utilization conduit downstream of the check valve 60. Since up to the cracking point of valve 74 pressures on opposite ends of plunger 82 were substantially equal, a very small quantity of fluid need be diverted through the venting passage to produce an appreciable pressure differential across the plunger 82. The action is a self-generating one, with further opening of control valve 74 increasing the pressure differential between chamber 42 and the utilization circuit, and thus increasing the force exerted on control valve 74 by the plunger 82. Control valve 74 is almost instantaneously carried to its full open position by plunger 82, thus completely venting chamber 42. Under these conditions pressure in chamber 42 will drop to negligible proportions and pressure plate 30 will no longer be maintained in abutment with ring 14 and will shift leftwardly. The sealing action of the face 45 of the valving member 34 of pressure plate 30 is disrupted by the leftward shifting of the pressure plate and the inlet and outlet zones of the pumping mechanism will be placed in communication with each other through the space thus created between face 45 and rotor 20. Thus fluid displaced from the outlet zones will be by-passed across the face of plate 34 to effectively unload the pump. The pump will remain unloaded until pressure in the utilization circuit, acting on area 88 of plunger 82, drops to a point where spring 90 returns valve 74 to the closed position. As heretofore noted, the end areas of plunger 82 are greater than the area of seat 72. Thus pressure in the utilization circuit must drop to an appreciably lower value than the pressure value in chamber 42, which initiated venting, before control valve 74 will re-seat.

The self-generating action of the unloading mechanism is further aided by the fact that control valve 74 shifts rightwardly while inducing leftward shift of pressure plate 30. The converse is true as dropping accumulator pressure permits control valve 74 to move leftward to induce rightward pressure plate movement. This countershifting of the valve and seat enhances the snap-acting qualities of the device.

There has thus been provided an improved, low cost, and sensitive pump unloading mechanism.

While the form of embodiment of the invention as herein disclosed constitutes a preferred form, it is to be understood that other forms might be adopted, all coming within the scope of the claims which follow.

What is claimed is as follows:

1. Unloading mechanism for a fluid pump of the type having rotary pumping structure with spaced inlet and outlet zones, a pressure chamber, and a shiftable pressure plate member in said chamber urged by pressure therein to a normal position providing only running clearance for the rotary structure and substantially isolating said zones from each other, comprising: a utilization circuit leading from said outlet zones and having a non-return valve therein; passage means providing restricted communication between said outlet zone and said pressure chamber; a venting passage leading from said pressure chamber through which said chamber may be vented to thereby effect shifting of said plate and thus interconnect said inlet and outlet zones; a normally closed control valve in the venting passage, said control valve having a pressure effective area exposed to pressure in said chamber, said area being so oriented as to shift said control valve in response to pressure in said chamber so as to open said venting passage; and plunger means adapted to contact the control valve and urge it toward an open position, said plunger having a first area exposed to pressure in said pressure chamber and a second, opposed area exposed to pressure in the utilization circuit downstream of the non-return valve, whereby the pressure chamber is initially vented by pressure therein acting on the control valve, and such venting is maintained by pressure in the utilization circuit acting on said plunger.

2. Unloading mechanism for a fluid pump of the type having rotary pumping structure with spaced inlet and outlet zones, a pressure chamber, and a shiftable pressure plate member in said chamber, urged by pressure therein to a normal position providing only running clearance for the rotary structure and substantially isolating said zones from each other, comprising: a utilization circuit leading from said outlet zones and having a non-return valve therein; passage means providing restricted communication between said outlet zone and said pressure chamber; a venting passage leading from said pressure chamber through which said chamber may be vented to thereby effect shifting of said plate and thus interconnect said inlet and outlet zones, said venting passage extending through the pressure plate; a normally closed control valve in the venting passage, said control valve having a pressure effective area exposed to pressure in said chamber, said area being so oriented as to shift said control valve in response to pressure in said chamber so as to open said venting passage; and plunger means adapted to contact the control valve and urge it toward an open position, said plunger having a first area exposed to pressure in said pressure chamber and a second, opposed area exposed to pressure in the utilization circuit downstream of the non-return valve, whereby the pressure chamber is initially vented by pressure therein acting on the control valve, and such venting is maintained by pressure in the utilization circuit acting on said plunger.

3. Unloading mechanism for a fluid pump of the type having rotary pumping structure with spaced inlet and outlet zones, a pressure chamber, and a shiftable pressure plate member in said chamber, urged by pressure therein to a normal position providing only running clearance for the rotary structure and substantially isolating said zones from each other, comprising: a utilization circuit leading from said outlet zones and having a non-return valve therein; passage means extending through the pressure plate providing restricted communication between said outlet zone and said pressure chamber; a venting passage leading from said pressure chamber through which said chamber may be vented to thereby effect shifting of said plate and thus interconnect said inlet and outlet zones, said venting passage extending through the pressure plate; a normally closed control valve in the venting passage, said control valve having a pressure effective area exposed to pressure in said chamber, said area being so oriented as to shift said control valve in response to pressure in said chamber so as to open said venting passage; and plunger means adapted to contact the control valve and urge it toward an open position, said plunger having a first area exposed to pressure in said pressure chamber and a second, opposed area exposed to pressure in the utilization circuit downstream of the non-return valve, whereby the pressure chamber is initially vented by pressure therein acting on the control valve, and such venting is maintained by pressure in the utilization circuit acting on said plunger.

4. Unloading mechanism for a fluid pump of the type having rotary pumping structure with spaced inlet and outlet zones, a pressure chamber, and a shiftable pressure plate member in said chamber, urged by pressure therein to a normal position providing only running clearance for the rotary structure and substantially isolating said zones from each other, comprising: a utilization circuit leading from said outlet zones and having a non-return valve therein; passage means providing restricted communication between said outlet zone and said pressure chamber; a venting passage leading from said pressure chamber through which said chamber may be vented to thereby effect shifting of said plate in one direction and thus interconnect said inlet and outlet zones, said venting passage extending through the pressure plate and having a valve seat therein; a normally closed control valve in the venting passage, said control valve having a pressure effective area exposed to pressure in said chamber, said area being so oriented as to shift said control valve, in response to pressure in said chamber, in a direction opposite to said one direction to open said venting passage; and plunger means adapted to contact the control valve and urge it toward an open position, said plunger having a first area exposed to pressure in said pressure chamber and a second, opposed area exposed to pressure in the utilization circuit downstream of the non-return valve, whereby the pressure chamber is initially vented by pressure therein acting on the control valve, and such venting is maintained by pressure in the utilization circuit acting on said plunger.

5. Unloading mechanism for a fluid pump of the type having rotary pumping structure with spaced inlet and outlet zones, a pressure chamber, and a shiftable pressure plate member in said chamber, urged by pressure therein to a normal position providing only running clearance for the rotary structure and substantially isolating said zones from each other, comprising: a utilization circuit leading from said outlet zones and having a non-return valve therein; passage means providing restricted communication between said outlet zone and said pressure chamber; a venting passage leading from said pressure chamber through which said chamber may be vented to thereby effect shifting of said plate and thus interconnect said inlet and outlet zones; countershifting valve means in said venting passage comprising a seat in said pressure plate and a normally closed control valve, said control valve having a pressure effective area exposed to pressure in said chamber, said area being so oriented as to shift said control valve in response to pressure in said chamber so as to open said venting passage; and plunger means adapted to contact the control valve and urge it toward an open position, said plunger having a first area exposed to pressure in said pressure chamber and a second, opposed area exposed to pressure in the utilization circuit downstream of the non-return valve, whereby the pressure chamber is initially vented by pressure therein acting on the control valve, and such venting is maintained by pressure in the utilization circuit acting on said plunger.

References Cited in the file of this patent

UNITED STATES PATENTS

| | | |
|---|---|---|
| 2,405,061 | Shaw | July 30, 1946 |
| 2,437,791 | Roth et al. | Mar. 16, 1948 |

FOREIGN PATENTS

| | | |
|---|---|---|
| 484,079 | Canada | June 17, 1952 |